US012752423B2

(12) United States Patent
Sutanto et al.

(10) Patent No.: US 12,752,423 B2
(45) Date of Patent: Oct. 6, 2026

(54) MANIPULABILITY AND JOINT-LIMIT DISTANCE OPTIMIZING INVERSE KINEMATICS

(71) Applicant: Intrinsic Innovation LLC, Mountain View, CA (US)

(72) Inventors: Giovanni Sutanto, Sunnyvale, CA (US); Jean-Francois Dupuis, San Francisco, CA (US); Ning Ye, Palo Alto, CA (US); Sean Alexander Rowan, Ben Lomond, CA (US); Stefan Schaal, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 129 days.

(21) Appl. No.: 18/529,964

(22) Filed: Dec. 5, 2023

(65) Prior Publication Data

US 2025/0178194 A1 Jun. 5, 2025

(51) Int. Cl.
*B25J 9/16* (2006.01)

(52) U.S. Cl.
CPC ........... *B25J 9/1664* (2013.01); *B25J 9/1607* (2013.01)

(58) Field of Classification Search
CPC ........... B25J 9/1664; B25J 9/1607; B25J 9/16
See application file for complete search history.

(56) References Cited

U.S. PATENT DOCUMENTS 4,698,572 A * 10/1987 Stone ..................... B25J 13/089 901/14
2010/0168919 A1 * 7/2010 Okamoto ............... B25J 9/1643 700/275

(Continued)

OTHER PUBLICATIONS

Clmc.usc.edu [online], "University of Southern California's CS545 Robotics Lecture 9" available on or before Feb. 25, 2022, via Internet Archive: Wayback Machine URL <https://web.archive.org/web/20220225082112/http://www-clmc.usc.edu/~cs545/CS545_Lecture_9.pdf>, retrieved on Nov. 12, 2024, retrieved from URL <http://www-clmc.usc.edu/~cs545/CS545_Lecture_9.pdf>, 17 pages.

(Continued)

*Primary Examiner* — Adam R Mott
*Assistant Examiner* — Sagar KC
(74) *Attorney, Agent, or Firm* — Fish & Richardson P.C.

(57) ABSTRACT

Methods, systems, and apparatus, including computer programs encoded on a computer storage medium, for controlling a robot to achieve a motion trajectory that simultaneously optimizes joint manipulability and joint-limit distance. In one aspect, a system comprises receiving a first waypoint that represents the current pose of a robot comprising a plurality of joints, receiving a second waypoint that represents a target pose of the robot, obtaining a first joint state that defines an angular joint configuration that corresponds with the first waypoint of the robot, generating a motion between the first joint state and a second joint state that defines an angular joint configuration that corresponds with the second waypoint of the robot by performing an optimization process that simultaneously optimizes a unified joint-manipulability-and-joint-limit-distance metric of the robot, and generating control rules for the motion to be followed by the robot that achieves the target pose of the second waypoint.

20 Claims, 5 Drawing Sheets

(56) References Cited

U.S. PATENT DOCUMENTS

| | | | | |
|---|---|---|---|---|
| 2014/0081461 | A1* | 3/2014 | Williamson | B25J 9/1643 700/261 |
| 2016/0221189 | A1* | 8/2016 | Nilsson | B25J 9/1653 |
| 2019/0105117 | A1* | 4/2019 | Brisson | A61B 34/30 |
| 2021/0379763 | A1* | 12/2021 | Denenberg | B25J 9/1671 |
| 2023/0294277 | A1* | 9/2023 | Yang | B25J 9/1605 700/217 |
| 2024/0131706 | A1* | 4/2024 | Sundaralingam | B25J 9/1664 |
| 2024/0326254 | A1* | 10/2024 | Felip Leon | H04N 23/695 |

OTHER PUBLICATIONS

Dufour et al., "On maximizing manipulability index while solving a kinematics task." Journal of Intelligent & Robotic Systems 100.1, Oct. 2020, 11 pages.

Scaron.info [online], "Differential inverse kinematics" Jul. 2024, retrieved on Nov. 7, 2024, retrieved from URL <https://scaron.info/robotics/differential-inverse-kinematics.html>, 8 pages.

* cited by examiner

MANIPULABILITY AND JOINT-LIMIT DISTANCE OPTIMIZING INVERSE KINEMATICS

BACKGROUND

This specification relates to robotics, and more particularly to controlling robotic movements.

Robotics control refers to scheduling the physical movements of robots in order to perform tasks. These tasks can be highly specialized. For example, an industrial robot that builds cars can be programmed to first pick up a car part and then weld the car part onto the frame of the car. As another example, a robot can pick up components for placement on a printed circuit board. Programming a robot to perform these actions can require planning and scheduling dozens or hundreds of individual movements by robot motors and actuators. In particular, the actions of the robot are accomplished by one or more end effectors mounted at the end, or last link of one or more moveable components, of the robot that are designed to interact with the environment.

Robotics planning has traditionally required immense amounts of manual programming in order to meticulously dictate how the robotic components should move in order to accomplish a particular task. Manual programming is tedious, time-consuming, and error prone. In addition, a manually programmed schedule that is manually generated for one workcell can generally not be used for other workcells. In this specification, a workcell is the physical environment in which a robot operates. Workcells have particular physical properties, e.g., physical dimensions, that impose constraints on how robots can move within the workcell. Thus, a manually programmed schedule for one workcell may be incompatible with a workcell having different robots, a different number of robots, or different physical dimensions.

Some robots can be programmed to perform online adaptation processes in order to react to changing situations in a workcell. To do so, a robot can dynamically compute a desired pose waypoint, e.g., a desired position and orientation, in Cartesian space and then use a motion planning method, such as inverse kinematics, to determine the joint velocities that are needed to achieve the desired waypoint. More specifically, a sequence of one or more desired waypoints in Cartesian space can be used to instruct a robot to follow a particular motion trajectory in joint space. In particular, these waypoints can be translated into joint space configurations via inverse kinematics, to plan out a sequence of one or more motions that achieve the given motion trajectory in joint space as a sequence of one or more generated control rules.

Controlling the robot according to the generated control rules in real-time involves a real-time control system. In this specification, a real-time control system is a software system that is required to perform actions within strict timing requirements in order to achieve normal operation. A real-time control system uses a real-time controller to dictate what action or movement a robot should take during every period of a control cycle, e.g., by controlling a movement of the joint of the robot with a position controller or a torque controller to achieve the target waypoint. The timing requirements often specify that certain processes must be executed or certain outputs must be generated within a particular time window in order for the system to avoid entering a fault state. In the fault state, the system can halt execution or take some other action that interrupts normal operation of a robot.

However, such online adaptation processes often run into problematic configurations, e.g., singular configurations. In this specification, a singular configuration is a configuration of the joints in the robot that severely limit control in one or more degrees of freedom. Often this means that velocity in the Cartesian space is either difficult, impossible, or requires a disproportionate amount of joint velocity to achieve.

SUMMARY

This specification describes a system implemented as computer programs on one or more computers in one or more locations that can control a robot to achieve a motion trajectory following a sequence of waypoints that simultaneously optimizes joint manipulability and joint-limit distance. More specifically, the system can generate control rules for the robot using inverse kinematics while simultaneously optimizing a unified joint-manipulability-and-joint-limit-distance metric for each joint of the robot. The control rules can be enforced with a controller to achieve a motion trajectory that can avoid fault states and singularities. In this specification, joint manipulability refers to the possible motion along different degrees of freedom, e.g., the directions in which independent motion can occur and joint-limit distance refer to how far the joint is from the joint's maximum and minimum extended position.

In particular, the system can receive a pair of waypoints representing the current pose and target pose of the robot, as well as the joint state that corresponds to the current pose waypoint, and generate a control rule for a motion that will bring the robot to a second joint state, e.g., a target joint state that corresponds to the target pose waypoint, while simultaneously optimizing the unified joint-manipulability-and-joint-limit-distance metric. The system can iteratively calculate control rules for each waypoint in a sequence of one or more waypoints that define a motion trajectory in order to generate the control rules that, when combined, result in a motion that simultaneously optimizes joint manipulability and joint-limit distance.

Particular embodiments of the subject matter described in this specification can be implemented so as to realize one or more of the following advantages.

The techniques of this specification can achieve motion that simultaneously optimizes joint manipulability and joint-limit distance. As an example, optimizing joint manipulability and joint-limit distance can involve maximizing a unified joint-manipulability-and-joint-limit-distance metric simultaneously. In this case, the optimization does not need to achieve the globally optimal solution, e.g., the absolute joint manipulability and joint-limit distance maxima for a given motion, but instead a locally optimal solution. In particular, the locally optimal solution can be a redundant solution, e.g., one out of many possible solutions, that achieves the desired motion.

In particular, maximizing joint manipulability is one of the desired traits for inverse kinematics methods. However, using inverse kinematics to optimize joint manipulability alone can result in robot motions that cause joints to approach their respective joint limits, which can further limit the range of motion of the robot and result in problematic configurations with restricted motion. By simultaneously optimizing joint manipulability and joint-limit distance, the system can generate control rules that ensure that these problematic configurations are avoided, e.g., by applying the control rules generated prior to execution. In particular, avoiding these problematic configurations is significantly less computationally expensive than determining the robot motion to exit a joint-limit pose, singular configuration, or fault state once it is reached.

Additionally, the system can enforce the control rules online without introducing any significant delay. In particular, the control rules can allow even a robot with hard real-time constraints, e.g., deterministic time constraints, to dynamically account for and mostly avert configurations with restricted motion. In particular, the control rules can be generated and enforced in real-time such that the system can control a movement of the joint of the robot with a position controller or a torque controller to achieve the target waypoint every control cycle. The control rules can also be deterministically enforced, e.g., such that no additional memory allocation or communications with remote processes, procedure calls, or access to the internet are needed during controller execution of an ongoing motion.

Additionally, the control rules can be enforced at a low-level of the software stack used to program the robot's motion, resulting in lower latency since lower levels generally have better real-time performance than higher levels of the software stack. This makes enforcing the control rules with a controller relatively computationally inexpensive, thereby enabling configurations with restricted motion to be avoided to the maximal extent possible, especially during sensor-driven/sensor-guided motion that requires reactivity, e.g., when there is a direct mapping between a sensor input and the robot motion. This can improve the speed and reactivity of robotic operations as well as reliability and safety. In particular, by avoiding these problematic configurations automatically during execution, uncertainty, delays, and safety risks related to joint-limit poses, singular configurations, or fault states can be minimized without introducing any significant delays, thereby improving the speed and safety of robotic operations.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
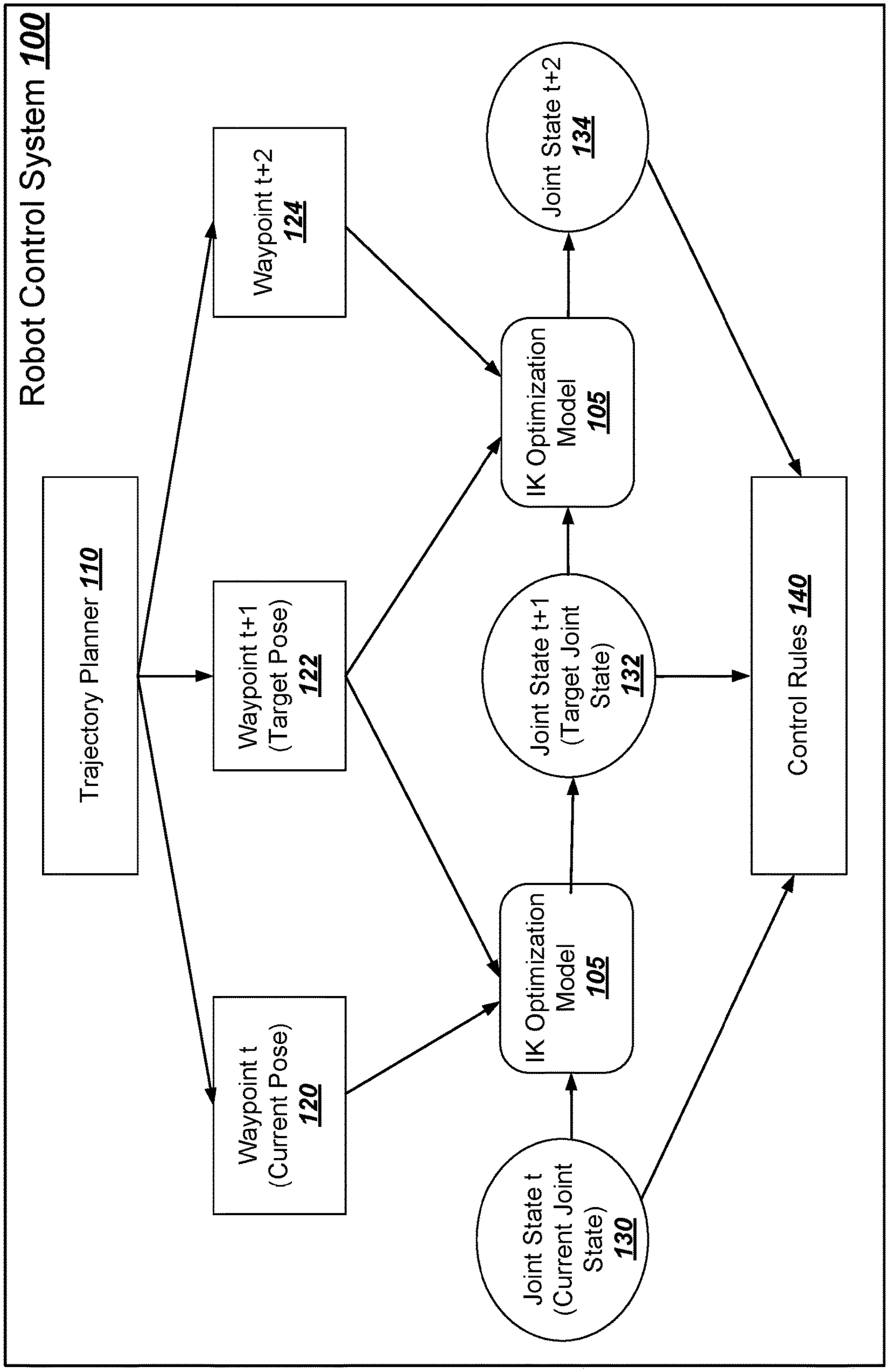
FIG. 1 is a block diagram of an example robot control system that uses a trajectory planner to generate control rules using an inverse kinematics constraint optimization model.

FIG. 1 depicts an example robot control system 100 that uses inverse kinematics to plan a motion trajectory for a robot. In particular, the robot control system 100 uses an inverse kinematics constraint optimization model 105 that can simultaneously optimize joint manipulability and joint-limit distance to generate control rules that can be enforced with a controller to achieve a motion trajectory that can avoid configurations with restricted joint motion. The robot control system 100 is an example of a system implemented as computer programs on one or more computers in one or more locations in which the systems, components, and techniques described below are implemented.

The system 100 can apply inverse kinematics to determine the motion of a robot to reach a desired pose. In particular, the motion can be achieved by controlling the joint position of each of the robot's joints in a sequence of motions using the kinematics equations. Given the desired robot joint positions of a target joint state, the system 100 can determine an appropriate joint command for which the joint state of the current pose can move to the target joint state of the target pose. The system 100 can then generate control rules 140 and apply the control rules 140 using a low-level joint position controller or low-level torque controller to move the robot joints from the initial pose to the target pose.

In the particular example depicted, the robot control system 100 includes a trajectory planner 110 that can plan out the motions of the robot by providing Cartesian waypoints for a given motion trajectory. As an example, the waypoints can be determined by discretizing the motion trajectory into a sequence of waypoints using a discretization interval, which will be described in further detail below. The system 100 can then process the sequence of waypoints using an inverse kinematics (IK) model, e.g., the IK optimization model 105.

The IK optimization model 105 can perform an optimization on an optimization target, e.g., a quantity that can include metrics to optimize for while operating under constraints, to generate the next joint state. In particular, the metric to be optimized can be a unified joint-manipulability-and-joint-limit-distance metric to ensure the model 105 generates control rules 140 that can avoid joint-limit poses, singularities, and fault states. In this case, simultaneously optimizing joint manipulability and joint-limit distance can involve maximizing the unified joint-manipulability-and-joint-limit-distance metric locally over the entire trajectory instead of achieving the global solution with the absolute joint manipulability and joint-limit distance maxima. An example robot control system that simultaneously maximizes a unified joint-manipulability-and joint-limit distance metric will be covered in more detail with respect to FIG. 2.

As an example, the trajectory planner can be a high-level trajectory planner that uses polynomial cubic or quintic splines to represent motion paths. For example, the trajectory planner can be a reward-based planner, an artificial potential field planner, or a grid- or sampling-based planner. In particular, the IK optimization model 105 can calculate the robot's joint state from a target Cartesian state using inverse kinematics, while optimizing the unified joint-manipulability-and-joint-limit-distance metrics simultaneously to generate the control rules 140 defining a corresponding motion in Cartesian space.

The trajectory planner 110 can define a series of waypoints for a motion trajectory in both offline and online settings. In the case of offline planning, the trajectory planner 110 can receive a desired motion sequence offline and discretize the motion sequence into a sequence of waypoints that can be used to plan out the motions of the robot offline. In the case of online planning, the trajectory planner 110 can define a series of waypoints corresponding to a motion trajectory for the robot to follow that corresponds with a trajectory being defined at real-time based on the robot's interactions within the workcell. In this case, each successive waypoint can be defined in relation to a goal that the robot is attempting to achieve at the next waypoint.

More specifically, the trajectory planner 110 can discretize an offline or online motion trajectory based on the defined discretization interval to define the sequence of waypoints. In the particular example depicted, the sequence of waypoints includes the current pose waypoint 120 at execution time index t, the waypoint 122 for t+1, and the waypoint 124 for t+2. In this case, the waypoint 122 for t+1 represents the target pose for the current pose waypoint 120 and the waypoint 124 for t+2 represents the target pose for waypoint 122. The system 100 can process each successive waypoint using the IK optimization model 105 to generate a joint motion in joint space that can help the robot to achieve the target pose waypoint in Cartesian space.

More specifically, at execution time index t, the IK optimization model 105 can process the waypoint 120 for t, the corresponding joint configuration in joint state 130 for t, the target waypoint 122 for t+1, and one or more metrics, e.g., a unified joint-manipulability-and-joint-limit-distance metric, and constraints, as inputs to provide the target joint state 132 for t+1, which corresponds to the waypoint 122 for t+1. Then, assuming the target joint state 132 is achieved successfully by the low-level joint position or the low-level joint torque controller, the IK optimization model 105 can repeat the process for the next waypoint: at the next execution time index t+1, the IK optimization model 105 can process the waypoint 122 for t+1, the joint state 132 for t+1, the waypoint 124 for t+2, and one or more constraints and metrics as inputs to provide the target joint state 134 for t+2 as the output that corresponds to the waypoint 124 for t+2.

The interval of discretization between waypoints can be determined using the kinematic Jacobian. In particular, the kinematic Jacobian matrix is a local linear approximation of the mapping from robot joint velocities to Cartesian velocities, as a function of the joint position of the robot. Since it is a local linear approximation, the Jacobian can be associated with an approximation error. As an example, the interval of discretization can be determined when the Jacobian approximation error satisfies a threshold that corresponds with the computed target joint state being achievable from the current joint state within one real-time control period, e.g., with one low-level joint position or torque command. More specifically, the system 100 can use the information from the kinematic Jacobian matrix to ensure that every two consecutive waypoints that serve as inputs to the IK optimization model 105 are close enough, e.g., with respect to the time interval between them in the motion trajectory, that the Jacobian remains a valid approximation.

The interval of discretization can be determined such that the Jacobian has small approximation error on both waypoints. In particular, the discretization interval can be calculated by evaluating an error metric of the kinematic Jacobian for each waypoint, where each waypoint is defined given a potential discretization interval, and determining a discretization interval with respect to the error metric. As an example, the discretization interval can be assessed by minimizing the error metric. As another example, the discretization interval can be assessed with respect to a tolerance value of the error metric, e.g., a tolerance value can be defined such that the computed target joint state is achievable from the current joint state with one joint position or torque command.

Figure 2:
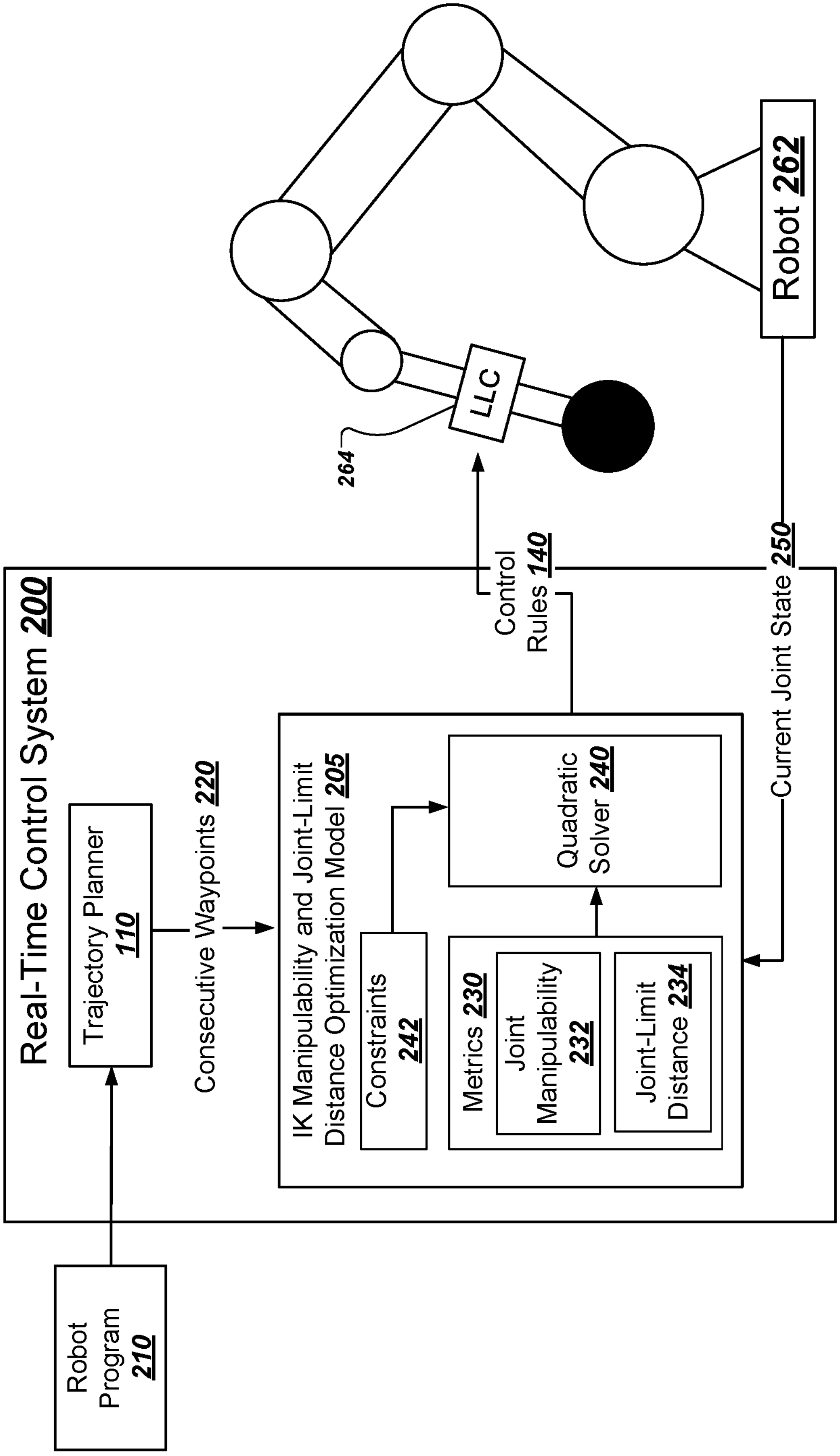
FIG. 2 is a block diagram of a real-time control system in which an example inverse kinematics constraint optimization model that simultaneously optimizes a unified joint-manipulability-and-joint-limit-distance metric provides control rules to a robot in order to achieve an optimal motion.

FIG. 2 is a block diagram of a real-time control system in which an inverse kinematics optimization model, e.g., the IK optimization model 105 of FIG. 1, provides control rules directly to a robot in order to achieve motion that simultaneously optimizes joint manipulability and joint-limit distance in real-time. More specifically, the real-time control system includes a trajectory planner, e.g., the trajectory planner 110, that can generate consecutive waypoints for the robot 262 to follow and an IK manipulability and joint-limit distance optimization model 205 that can process the consecutive waypoints 220 and the current joint state 250 of the robot 262 while simultaneously optimizing joint manipulability 232 and joint limit-distance 234 metrics simultaneously to generate control rules 140 in real-time.

In particular, the real-time control system 200 can control a robot 262 to perform the actions of a robot program 210. The robot program 210 can be a set of encoded instructions that specify how the robot should perform a particular task. When executed by an appropriately programmed real-time or non real-time computer system, the robot program 210 can provide a goal pose to a trajectory planner 110 that can define the consecutive waypoints 220 necessary for achieving the desired goal pose, as demonstrated in FIG. 1. The real-time system 200 can ensure that the robot 262 tracks the motion defined by the waypoints 220 using an IK optimization model. In some examples, the first waypoint can correspond to the Cartesian pose before the robot is moving. In this case, the first waypoint of the consecutive waypoints 220 can be defined by performing a forward kinematics computation on an available joint state, e.g., a current joint state 250. As an example, the current joint state 250, e.g., a vector defining the joint positions of the robot, can be sensed from one or more sensors on the robot 262.

In the particular example depicted, the IK optimization model is an IK manipulability and joint-limit distance optimization model 205 that simultaneously optimizes both joint manipulability and joint-limit distance metrics by combining both metrics 230 into a unified joint-manipulability-and-joint-limit-distance metric. More specifically, the IK model 205 can process the consecutive waypoints 220 and the current joint state 250 to perform inverse kinematics to optimize the metrics 230—the joint manipulability 232 and joint-limit distance 234 metrics—while operating under one or more constraints 242, as will be described below.

In particular, the joint manipulability metric 232 can be derived from the kinematic Jacobian matrix. As an example, the joint manipulability m can be defined as $$m = \sqrt{\det(JJ^T)},$$

where J is the Jacobian and det( ) is the determinant function, which can be used to find a scalar value as a function of the entries of the Jacobian matrix. The joint-limit distance metric can be defined as the distance between the joint position vector from the current joint state 250, and the minimum and maximum possible joint position vectors, e.g., the vector that represents every robot joint at each joint's respective limit. As an example, the joint-limit distance d can be defined as d=min (stack ($[q^{max}-q, q-q^{min}]$)), where q is the joint position vector from the current joint state 250, $q^{min}$ and $q^{max}$ are the minimum and maximum joint position limit vectors, respectively, and stack ( ) defines a way of combining the two vector differences along a horizontal or vertical matrix axis into a matrix. The IK manipulability and joint-limit distance optimization model 205 can then combine the joint manipulability metric and joint-limit distance metric into a unified joint-manipulability-and-joint-limit-distance metric, e.g., by using multiplication: p=md.

In some examples, a differentiable minimum function can be applied to the joint-limit distance metric. As an example, the standard minimum function can be replaced with the soft-minimum function:

$$\frac{\sum_{i=1}^{n} x_i e^{-\alpha_s x_i}}{\sum_{j=1}^{n} e^{-\alpha_s x_j}}$$

with a chosen value of precision scaling parameter $\alpha_s \geq 0$. In this case, the bigger the value of $\alpha_s$, the closer the soft-minimum function approximates the standard minimum function. For example, the value of the precision parameter can be determined with experimental testing.

The IK manipulability and joint-limit distance metric optimization model 205 can then define an optimization target, e.g., in accordance with the kinematic equations and the joint manipulability metric 232 and joint-limit distance metric 234 while operating under constraints 242, and perform optimization. In the particular example depicted, the optimization is quadratic, e.g., a convex optimization, performed with a quadratic solver 240. As another example, the optimization can be a nonlinear constraint optimization. In some cases, the optimization can be performed using a linear programming, genetic algorithm, evolutionary, or simulated annealing method. As another example, the optimization can be performed using a gradient descent or momentum-based method.

More specifically the quadratic solver 240 can perform a quadratic optimization on the defined optimization target. In particular, the solver 240 can minimize a kinematics optimization target in accordance with the joint manipulability 232 and joint-limit distance 234 metrics while satisfying one or more constraints. As an example, the solver 240 can perform the optimization on the optimization target:

$$\min_{\dot{q}} \frac{1}{2}\alpha\left(\dot{q} - \dot{q}^{des}\right)^T\left(\dot{q} - \dot{q}^{des}\right) - \beta(\nabla p)^T \dot{q}$$

where the optimization target is defined by deriving a joint velocity $$\dot{q}$$

from the joint state q and subtracting a scalar product of the gradient of the metric p and the joint velocity $$\dot{q}$$

from the norm of the difference of the joint velocity $$\dot{q}$$

and desired joint velocity $$\dot{q}^{des}$$

In this case, the optimization is defined as a minimization over the joint velocity $$\dot{q}$$

More specifically, minimizing the additional cost term $$-\beta(\nabla p)^T \dot{q}$$

can result in a maximization of the unified joint-manipulability-and-joint-limit-distance metric, since the quantity is subtracted. In the case that the soft-minimum is applied, p can be smooth and differentiable, i.e., the gradient of p exists. In this case, the gradient term can be approximated numerically.

The optimization constraints 242 can include constraints defined on the kinematic Jacobian, joint position limit vectors, and joint velocity limit vectors. As an example, additional constraints can be defined such that the product of the Jacobian and the joint velocity vector is restricted, and that the joint velocity vector remains between a minimum and maximum defined value.

The quadratic solver 240 can perform quadratic optimization to output a joint state that corresponds with the target waypoint, which can then be used to generate control rules 140 that parametrize the motion between the current and target waypoints. In particular, these control rules 140 can be used in the low-level software stack to control the robot 262 via low-level controllers 264, such as low-level joint position controllers or low-level torque controllers.

Figure 3:
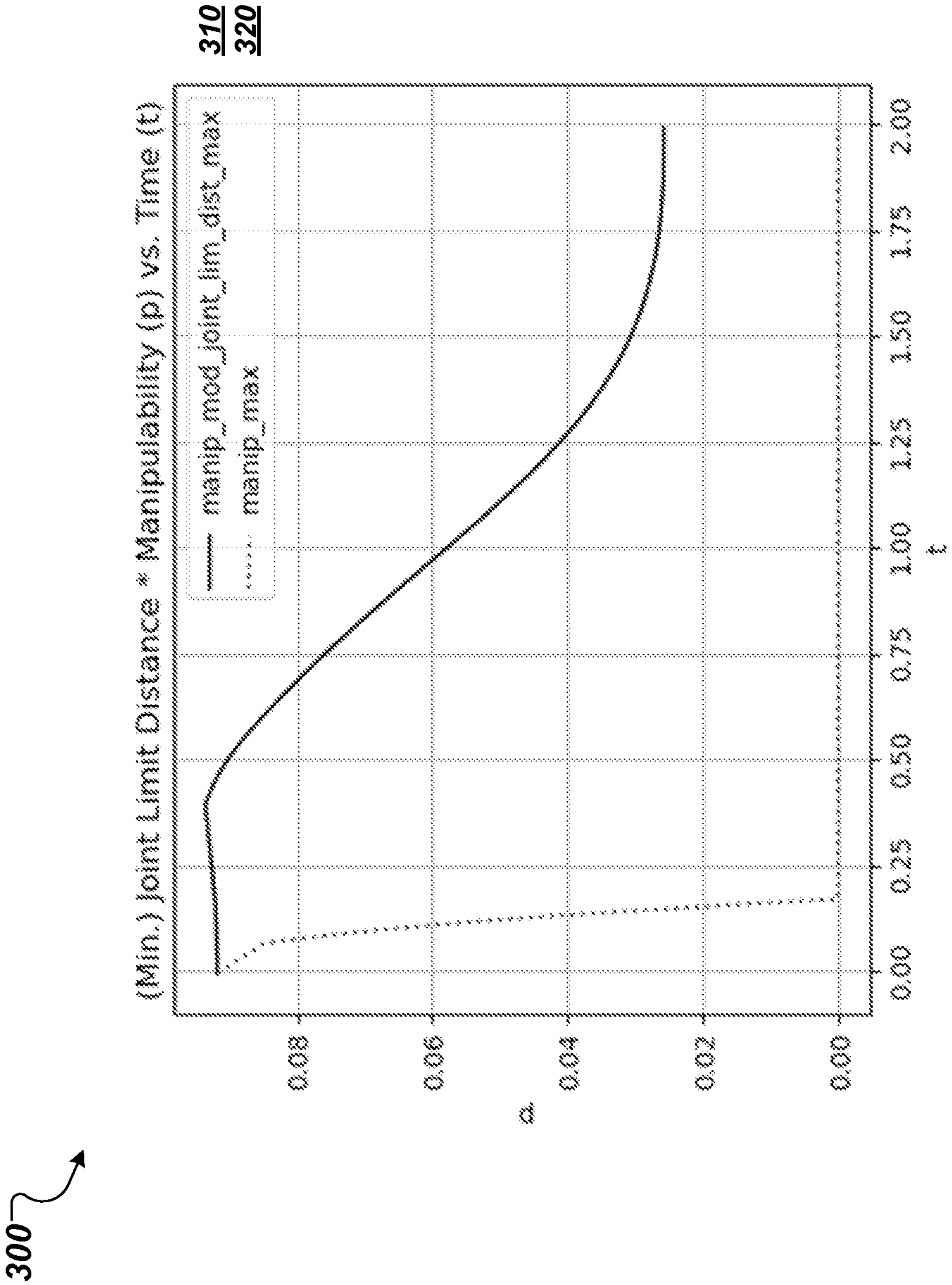
FIG. 3 illustrates how an inverse kinematics optimization model that optimizes for joint manipulability alone can result in a motion that approaches the joint-limit.

FIG. 3 demonstrates how the inverse kinematics manipulability and joint-limit optimization model of FIG. 2 can be used to avoid a joint-limit. In particular, FIG. 3 provides a graph that illustrates how an IK model that optimizes manipulability alone can result in a motion that reaches the joint-limit, while an IK model that simultaneously optimizes manipulability and joint-limit distance results in a motion that does not constrict the motion of the robot.

Graph 300 depicts the combined manipulability and joint-limit distance metric p=md versus time over the course of a robot motion, where m is manipulability and d is the joint-limit distance (as defined in the detailed description of FIG. 2), for two different optimizations performed by an IK optimization model over a motion trajectory: an optimization on joint manipulability alone 320 and an optimization simultaneously on joint manipulability and joint limit-distance 310. As an example, the simultaneous optimization 310 can be the example optimization described in FIG. 2.

In particular, graph 300 depicts two different motions to juxtapose control rules generated by an IK optimization model with two different optimization targets: one that optimizes, e.g., maximizes, joint manipulability only and one that simultaneously optimizes, e.g., maximizes, a unified joint-manipulability-and-joint-limit-distance metric.

In particular, the graph 300 illustrates how the quantity p decreases rapidly to 0 for the joint manipulability only optimization 320. In particular, within 0.25 sec, the quantity p collapses to zero. Since m is being maximized according to the optimization, this must be because d is 0, e.g., one of the joint-limits has been reached. On the other hand, the quantity p does not collapse, e.g., remains greater than 0, over the course of the extension motion for the simultaneous optimization 310. In particular, the simultaneous optimization 310 represents a more optimal and efficient motion since the robot preserves joint manipulability while not getting stuck in a joint-limit.

Preserving joint motion for the available joint degrees of freedom is advantageous as it improves the speed and safety of robotic operations. In particular, ensuring the robot does not get stuck in a configuration with restricted motion can prevent costly delays and downtime in production, preclude safety risks, and increase the reactivity of robotic operations.

Figure 4:
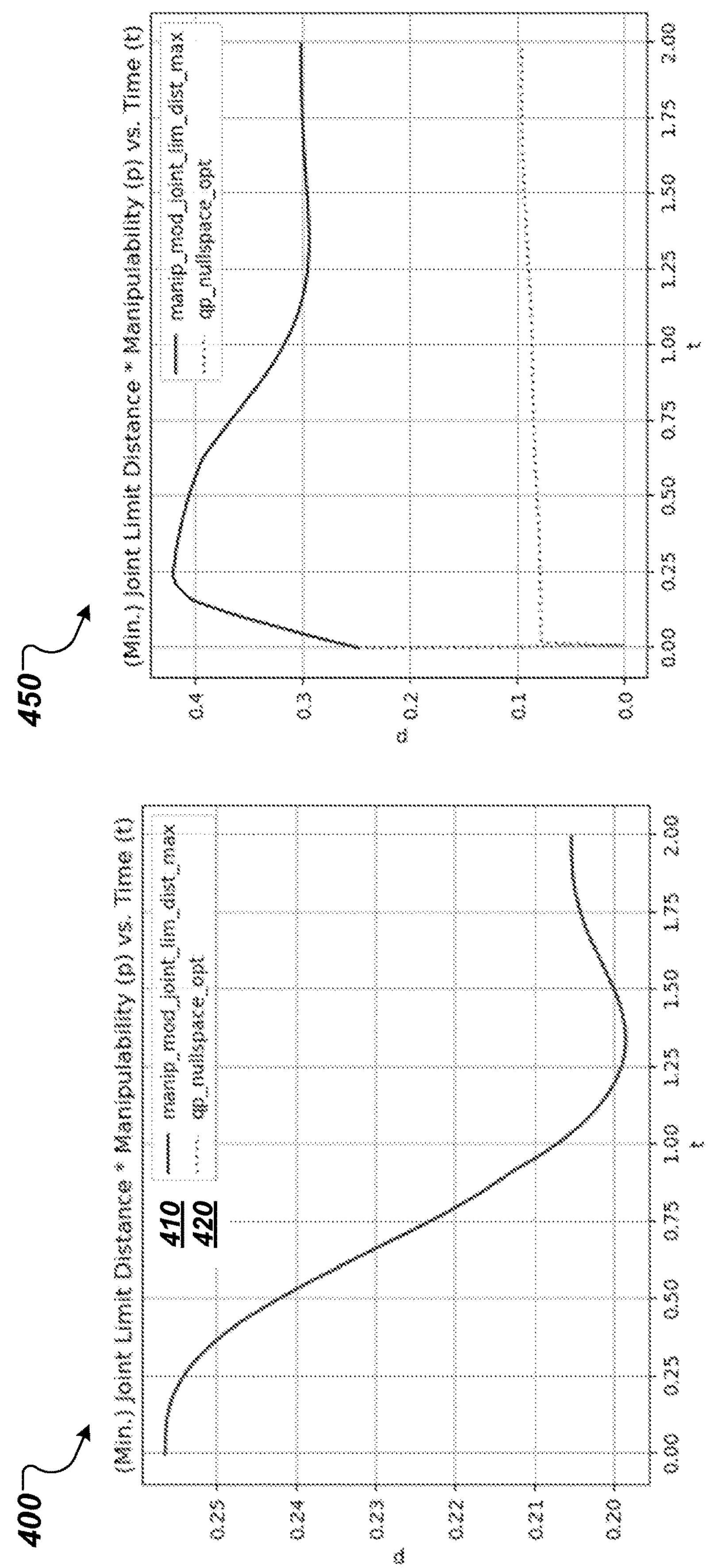
FIG. 4 illustrates how the inverse kinematics optimization model of FIG. 2 performs compared to a classical nullspace inverse kinematics model under no-redundancy and with-redundancy cases.

FIG. 4 illustrates how an inverse kinematics model that simultaneously optimizes for joint manipulability and joint-limit distance, e.g., the IK model 205 with unified manipulability-and-joint-limit-distance metric of FIG. 2, performs compared to a generally applied classical inverse kinematics optimization, e.g., a nullspace optimization, under a no-redundancy case with a full-pose constraint, and a with-redundancy case with a position-only constraint.

In particular, graphs 400 and 450 depict the metric p=md versus time for the simultaneous optimization technique of this specification 410 and the quadratic programming (QP) nullspace optimization 420. More specifically, the graphs 400 and 450 depict full-pose and position-only constraint optimization, respectively, on a robot with six total degrees of freedom. More specifically, the six total degrees of freedom in each space correspond with six joints in the robot.

Graph 400 depicts a comparison between the optimizations 410 and 420 for the full-pose constraint, e.g., where the Cartesian space has constraints imposed on both positional and orientational degrees of freedom. In particular, the full-pose constraints include constraints on degrees of freedom in the x, y, and z directions, and constraints on the orientational degrees of freedom in the pitch, yaw, and roll directions. In this case, both optimization methods perform similarly as demonstrated by the near perfect overlap of the progression of quantity p with time for both 410 and 420 in graph 400. More specifically, there is no noticeable difference between optimizations 410 and 420 since the full-pose constraint on the six Cartesian degrees of freedom of the robot prevents any potential locally optimal redundant motion solution from being exploited over the degrees of freedom. In particular, there can be only one solution when constraining all the degrees of freedom.

In contrast, graph 450 depicts a comparison between the optimizations 410 and 420 for the position-only constraint, e.g., where the Cartesian space is constrained in the three positional degrees of freedom in the x, y, and z directions, while the joint space retains all six degrees of freedom. As an example of a position-only constraint application, a robot being controlled to write with a pencil can be constrained in the x, y, and z directions while being allowed to orient its hand freely in an unconstrained manner according to pitch, yaw, and roll as deemed appropriate by the control rules.

In particular, graph 450 demonstrates the improvement of the simultaneous optimization 410 over the classical nullspace optimization 420 when there are potential redundancies to be exploited: the optimization 410 maintains a greater quantity for p over the motion trajectory than the classical optimization 420. More specifically, when there are only three position constraints, the simultaneous optimization can exploit the redundancy available in the remaining three orientational degrees of freedom to locally optimize joint manipulability and joint-limit distance simultaneously.

Figure 5:
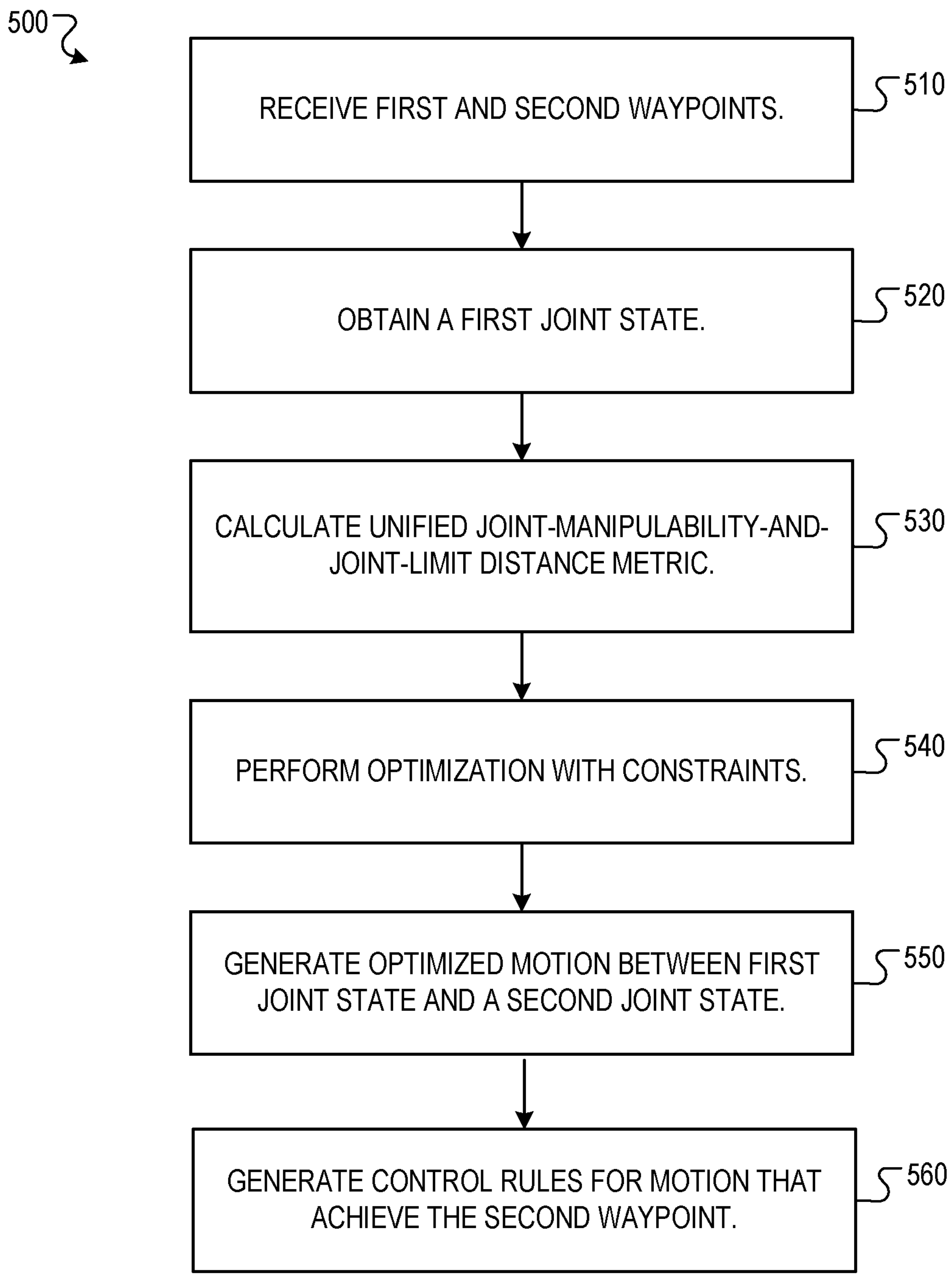
FIG. 5 is a flow diagram for an example process that can generate control rules for a robot by optimizing a unified joint-manipulability-and-joint-limit-distance metric. Like reference numbers and designations in the various drawings indicate like elements.

FIG. 5 is a flow chart for an example process for generating control rules for a robot that simultaneously optimizes joint manipulability and joint-limit distance over a motion trajectory. For convenience, the process 500 will be described as being performed by a system of one or more computers located in one or more locations. For example, a control system, e.g., the offline robot control system 100 of FIG. 1 or the online real-time control system 200 of FIG. 2, appropriately programmed in accordance with this specification, can perform the process 500.

The system can receive the first and second waypoints defining the current and target pose for the robot (step 510). As an example, the first and second waypoints can be defined by a trajectory planner that discretizes a motion trajectory in Cartesian space. In particular, the first waypoint can be the current pose of the robot and the second waypoint can represent a pose that gets the robot closer to achieving a target state. In some cases, the current pose can be obtained using a sensor reading from the robot, as described below.

The system can also obtain a first joint state that corresponds with the first waypoint (step 520). In particular, the first joint state can be a vector that characterizes the positions, e.g., angles, of the robot joints in joint space. As an example, the system can receive the current joint state from a joint sensor reading. In some implementations, steps 510 and 520 are interchangeable in order. For example, in some cases, the current joint state of step 520 can be mapped into the first waypoint in step 510 using forward kinematics.

The system can then calculate a unified joint-manipulability-and-joint-limit-distance-metric with respect to the first joint state (step 530). In particular, an inverse kinematics optimization model can calculate a joint-manipulability metric and joint-limit distance metric and combine them in a unified joint-manipulability-and-joint-limit-distance metric, e.g., using multiplication. The system can then process the first and second waypoints, the first joint state, and the unified joint-manipulability-and-joint-limit-distance metric, and one or more constraints to perform an optimization on the defined optimization target (step 540). As an example, this optimization can be a quadratic optimization performed with a quadratic solver.

The system can then generate a locally-optimal, e.g., with respect to joint manipulability and joint-limit distance, motion between the first joint state and a second joint state using the output of the optimization (step 550). The system can generate control rules for the motion that achieve the second waypoint (step 560). In particular, the inverse kinematics model can generate control rules that can be used to control a low-level joint position controller or low-level torque controller to move the robot in accordance with the optimal motion in such a way as to avoid configurations with restricted motion, such as joint-limits, singular configurations, and fault states.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A computer-implemented method comprising:

receiving a first waypoint that represents a current pose of a robot comprising a plurality of joints;

receiving a second waypoint that represents a target pose of the robot;

obtaining a first joint state that defines an angular joint configuration that corresponds with the first waypoint of the robot;

generating a motion between the first joint state and a second joint state that defines an angular joint configuration that corresponds with the second waypoint of the robot, wherein generating the motion comprises performing an optimization process on the first and second joint states of the robot that optimizes a unified joint-manipulability-and-joint-limit-distance metric of the robot to simultaneously maximize, for each joint in the plurality of joints, (i) a measure of possible motion of different degrees of freedom for the joint and (ii) a joint-limit distance that combines a first difference between the first joint state and a maximum joint state for the joint and a second difference between the first joint state and a minimum joint state for the joint; and generating control rules for the motion to be followed by the robot based on the target pose of the second waypoint.

2. The method of claim 1, wherein the motion between the first joint state and the second joint state comprises causing the robot to move to avoid joint limits of the robot.

3. The method of claim 1, wherein receiving the first waypoint comprises performing a forward kinematics computation on the first joint state.

4. The method of claim 1, wherein the first waypoint is a waypoint within a defined motion trajectory comprising a sequence of waypoints and the second waypoint is an intermediate waypoint of the trajectory that defines an intermediate pose of the robot.

5. The method of claim 1, wherein the first waypoint is a penultimate waypoint within a defined motion trajectory comprising a sequence of waypoints and the second waypoint is a final waypoint in the trajectory that defines a final pose of the robot.

6. The method of claim 4, wherein generating control rules for each waypoint in the sequence of waypoints of the motion trajectory further comprises creating a sequence of control rules that achieves the sequence of motion according to the trajectory.

7. The method of claim 4, wherein defining the trajectory of waypoints comprises discretizing a planned motion trajectory into a sequence of waypoints.

8. The method of claim 7, wherein discretizing the planned motion trajectory comprises determining an interval of discretization further comprising:

evaluating an error metric of a kinematic Jacobian for each waypoint defined by the interval;

assessing the error metric of the interval with respect to a tolerance value of the error metric; and determining the interval of discretization between waypoints.

9. The method of claim 1, further comprising defining the unified joint-manipulability-and-joint-limit-distance metric of the robot.

10. The method of claim 9, wherein defining the unified joint-manipulability-and-joint-limit-distance metric comprises, for each joint of the robot:

deriving a manipulability metric from a kinematic Jacobian matrix;

defining a joint-limit distance metric comprising a matrix defining the distance between a current joint position vector and minimum and maximum joint position limit vectors;

applying a differentiable minimum function to the joint-limit distance metric to define the joint-limit distance metric; and multiplying the manipulability metric and joint-limit distance metric to define the unified joint-manipulability-and-joint-limit-distance metric.

11. The method of claim 10, wherein applying the differentiable minimum function to the joint-limit distance metric comprises applying a soft minimum function containing a precision scaling parameter.

12. The method of claim 10, wherein performing the optimization process on the first and second joint states of the robot that simultaneously optimizes the unified joint-manipulability-and-joint-limit-distance metric of the robot comprises, for each joint within a joint vector:

identifying a joint velocity of the second joint state;

subtracting a product comprising a gradient of the unified joint-manipulability-and-joint-limit-distance metric from a norm of the difference between the joint velocity of the second joint state and a desired joint velocity to yield an optimization target;

minimizing the optimization target in accordance with one or more constraints; and generating the motion between the first and second waypoint.

13. The method of claim 12, wherein the one or more constraints comprise constraints defined on a kinematic Jacobian, joint position limit vectors, and joint velocity limit vectors.

14. The method of claim 12, wherein the unified joint-manipulability-and-joint-limit-distance metric and the one or more constraints are defined with respect to the degrees of freedom of the robot.

15. A system comprising one or more computers and one or more storage devices storing instructions that are operable, when executed by the one or more computers to cause the one or more computers to perform operations comprising:

receiving a first waypoint that represents a current pose of a robot comprising a plurality of joints;

receiving a second waypoint that represents a target pose of the robot;

obtaining a first joint state that defines an angular joint configuration that corresponds with the first waypoint of the robot;

generating a motion between the first joint state and a second joint state that defines an angular joint configuration that corresponds with the second waypoint of the robot, wherein generating the motion comprises performing an optimization process on the first and second joint states of the robot that optimizes a unified joint-manipulability-and-joint-limit-distance metric of the robot to simultaneously maximize, for each joint in the plurality of joints, (i) a measure of possible motion of different degrees of freedom for the joint and (ii) a joint-limit distance that combines a first difference between the first joint state and a maximum joint state for the joint and a second difference between the first joint state and a minimum joint state for the joint; and generating control rules for the motion to be followed by the robot based on the target pose of the second waypoint.

16. The system of claim 15, further comprising defining the unified joint-manipulability-and-joint-limit-distance metric of the robot.

17. The system of claim 16, wherein defining the unified joint-manipulability-and-joint-limit-distance metric comprises, for each joint of the robot:

deriving a manipulability metric from a kinematic Jacobian matrix;

defining a joint-limit distance metric comprising a matrix defining the distance between a current joint position vector and minimum and maximum joint position limit vectors;

applying a differentiable soft-minimum function to the joint-limit distance metric to define the joint-limit distance metric; and multiplying the manipulability metric and joint-limit distance metric to define the unified joint-manipulability-and-joint-limit-distance metric.

18. A non-transitory computer storage medium encoded with a computer program, the program comprising instructions that are operable, when executed by data processing apparatus to cause the data processing apparatus to perform operations comprising:

receiving a first waypoint that represents a current pose of a robot comprising a plurality of joints;

receiving a second waypoint that represents a target pose of the robot;

obtaining a first joint state that defines an angular joint configuration that corresponds with the first waypoint of the robot;

generating a motion between the first joint state and a second joint state that defines an angular joint configuration that corresponds with the second waypoint of the robot, wherein generating the motion comprises performing an optimization process on the first and second joint states of the robot that optimizes a unified joint-manipulability-and-joint-limit-distance metric of the robot to simultaneously maximize, for each joint in the plurality of joints, (i) a measure of possible motion of different degrees of freedom for the joint and (ii) a joint-limit distance that combines a first difference between the first joint state and a maximum joint state for the joint and a second difference between the first joint state and a minimum joint state for the joint; and generating control rules for the motion to be followed by the robot based on the target pose of the second waypoint.

19. The non-transitory computer storage medium of claim 18, further comprising defining the unified joint-manipulability-and-joint-limit-distance metric of the robot.

20. The non-transitory computer storage medium of claim 19, wherein defining the unified joint-manipulability-and-joint-limit-distance metric comprises, for each joint of the robot:

deriving a manipulability metric from a kinematic Jacobian matrix;

defining a joint-limit distance metric comprising a matrix defining the distance between a current joint position vector and the minimum and maximum joint position limit vectors;

applying a differentiable soft-minimum function to the joint-limit distance metric to define the joint-limit distance metric; and multiplying the manipulability metric and joint-limit distance metric to define the unified joint-manipulability-and-joint-limit-distance metric.

* * * * *